(12) United States Patent
Maier et al.

(10) Patent No.: US 11,206,804 B2
(45) Date of Patent: Dec. 28, 2021

(54) DEVICE FOR JOINING MILK FLOWS AND METHOD FOR USING SAID DEVICE

(71) Applicants: Jakob Maier, Turkheim (DE); Wilfried Hatzack, Turkheim (DE)

(72) Inventors: Jakob Maier, Turkheim (DE); Wilfried Hatzack, Turkheim (DE)

(*) Notice: Subject to any disclaimer, the term of this patent is extended or adjusted under 35 U.S.C. 154(b) by 213 days.

(21) Appl. No.: 16/326,269

(22) PCT Filed: Jul. 20, 2017

(86) PCT No.: PCT/EP2017/068326
§ 371 (c)(1),
(2) Date: Feb. 18, 2019

(87) PCT Pub. No.: WO2018/033339
PCT Pub. Date: Feb. 22, 2018

(65) Prior Publication Data
US 2019/0216039 A1 Jul. 18, 2019

(30) Foreign Application Priority Data
Aug. 19, 2016 (DE) .......................... 102016215634.9

(51) Int. Cl.
*A01J 5/04* (2006.01)
(52) U.S. Cl.
CPC ..................... *A01J 5/041* (2013.01)
(58) Field of Classification Search
CPC ..................... A01J 5/041; A01J 5/04
See application file for complete search history.

(56) References Cited

U.S. PATENT DOCUMENTS

| 4,231,323 A * | 11/1980 | Olander | A01J 5/041 119/14.08 |
| 4,434,744 A * | 3/1984 | Millar | A01J 5/041 119/14.02 |
| 8,485,047 B2 * | 7/2013 | Hoefelmayr | G01F 11/284 73/861.53 |

FOREIGN PATENT DOCUMENTS

| DE | 86709 A1 | 12/1971 |
| DE | 2810087 | 9/1979 |

(Continued)

OTHER PUBLICATIONS

Search Report in corresponding German Application No. 10 2016 215 634.9, dated May 11, 2017; 3 pages.

(Continued)

*Primary Examiner* — Timothy D Collins
*Assistant Examiner* — Madeline L Douglas
(74) *Attorney, Agent, or Firm* — Fattibene and Fattibene LLC; Paul A. Fattibene

(57) ABSTRACT

The present invention therefore provides a modular system for constraining milk flow in a pressure-dependent and/or controlled manner. Due to the modular concept, the required properties of the device can be adjusted in an efficient manner. For example, it is possible to adapt the connection to a milk line, i.e., the geometry of the connection arrangement, specifically to the existing conditions of the milking stall and the milking system. The pressure-dependent constraining when milking can be adjusted specifically for a single teat or in pairs for two teats by using a respective module component. If necessary, adjustment of the range for reliable switching can be performed by selecting suitable spring components and/or by adapting the flow resistance. The flow resistance is adjustable by using a suitable connection arrangement and/or by exchanging a modular flow body.

25 Claims, 3 Drawing Sheets

(56) References Cited

FOREIGN PATENT DOCUMENTS

| DE | 2810087 A1 | * | 9/1979 | ................ A01J 5/04 |
| EP | 2524591 | | 11/2012 | |
| EP | 2524591 A1 | * | 11/2012 | .............. A01J 5/041 |
| GB | 2021379 | | 12/1979 | |
| GB | 2191076 | | 12/1987 | |
| GB | 2191076 A | * | 12/1987 | .............. A01J 5/041 |
| WO | WO 2014098752 | | 6/2014 | |
| WO | WO-2014098752 A1 | * | 6/2014 | .............. A01J 5/041 |

OTHER PUBLICATIONS

International Search Report for corresponding International Application No. PCT/EP207/068326, dated Dec. 1, 2017; 3 pages.

Official Communication in corresponding EPO application No. 17 742 238.3 dated Dec. 9, 2020; 5 pages.

English translation of PCT Written Opinion of the ISA in corresponding PCT application PCT/EP2017/068326 dated Dec. 1, 2017, 7 pages.

Office Action in corresponding Canadian application 3034306 dated Dec. 10, 2019, 4 pages.

English translation of Office Action in corresponding German application No. 10 2016 215 634.9 dated May 11, 2017; 3 pages.

\* cited by examiner

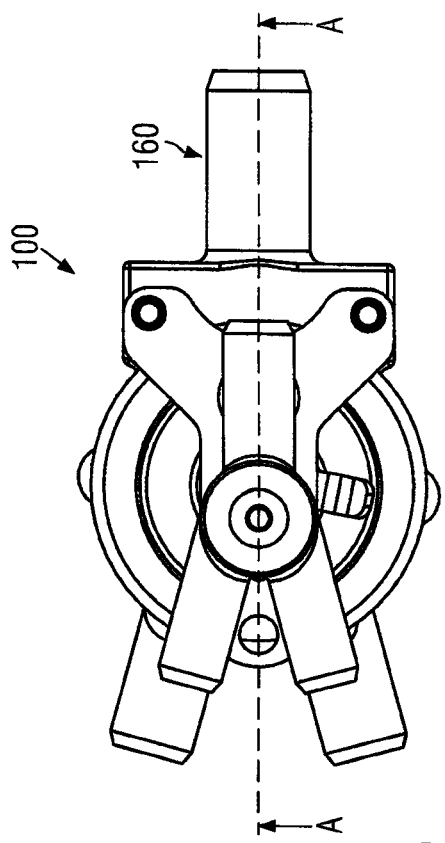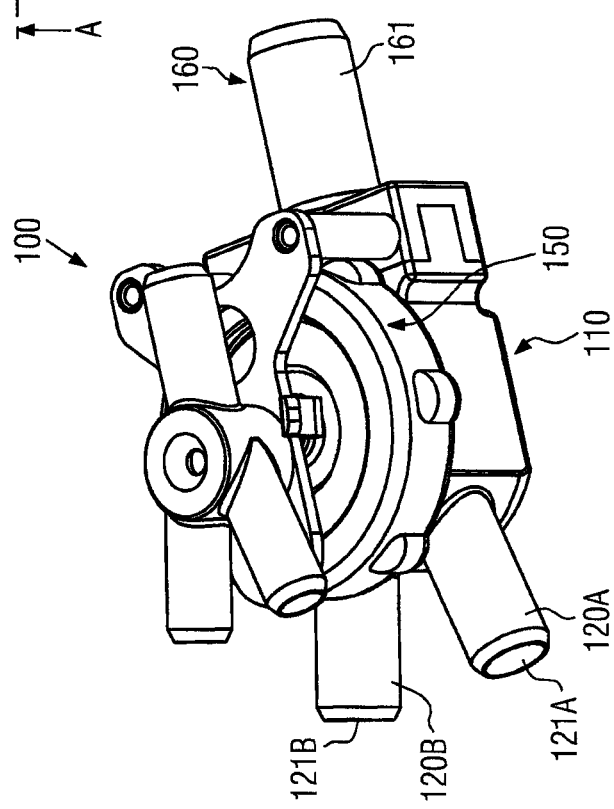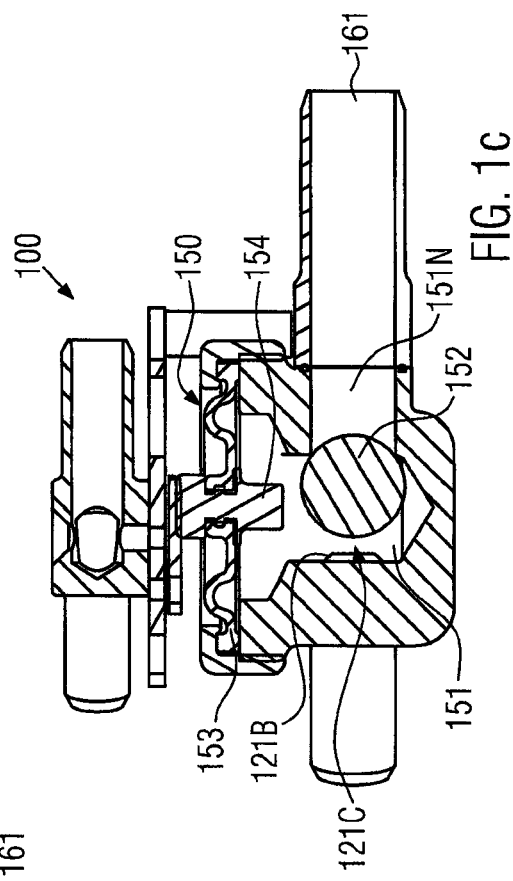

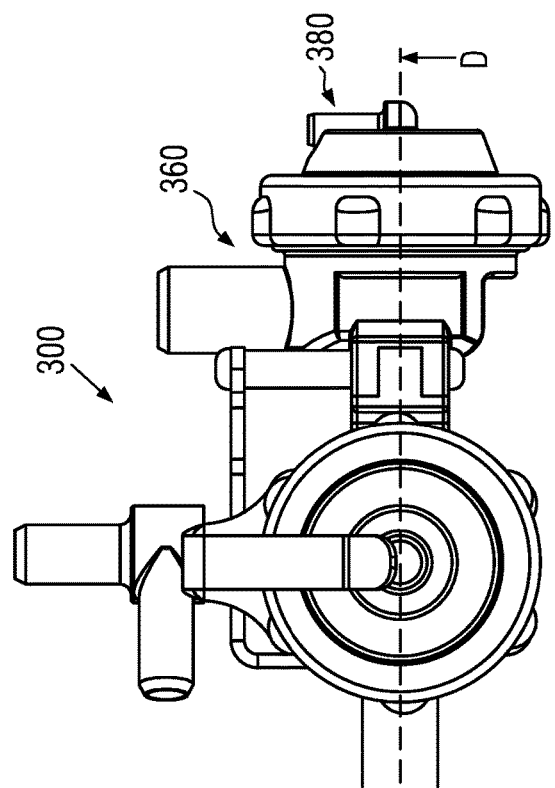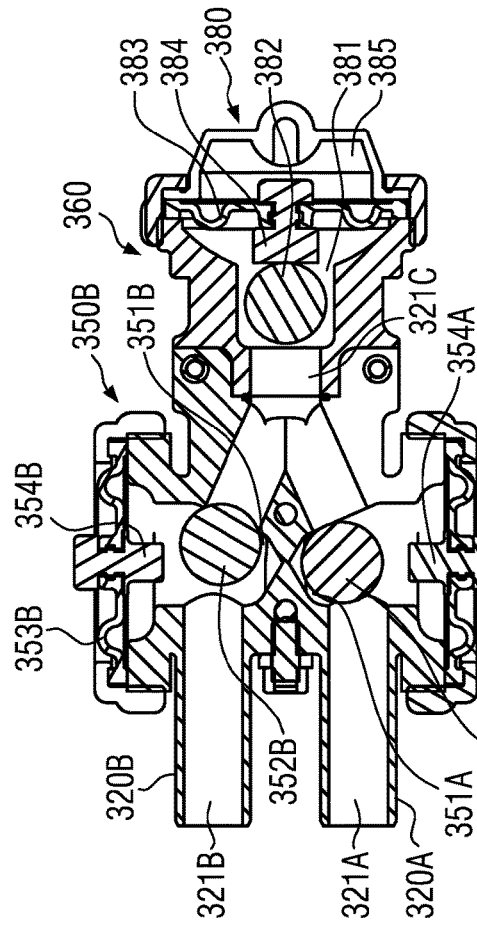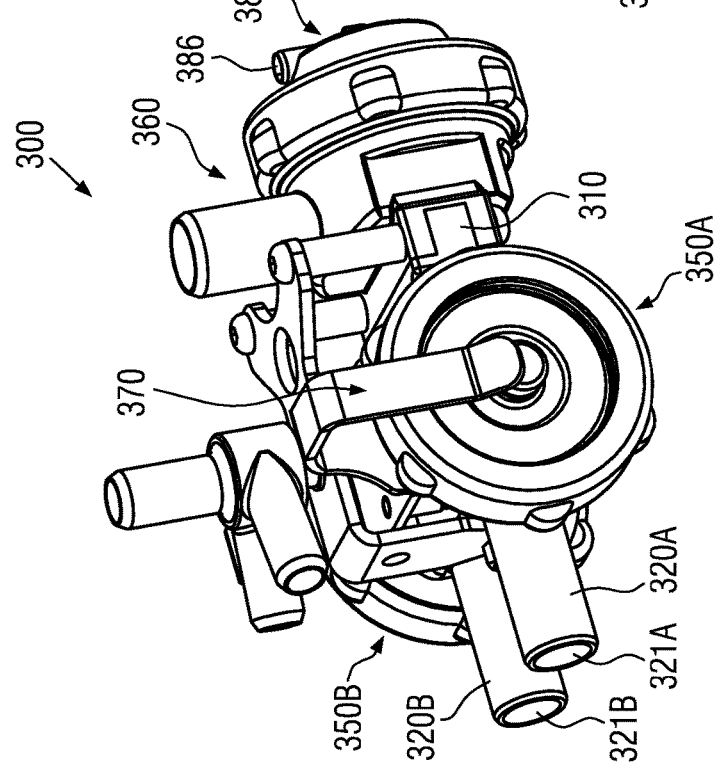

DEVICE FOR JOINING MILK FLOWS AND METHOD FOR USING SAID DEVICE

FIELD OF THE INVENTION

The present invention relates generally to the field of milking technology, and in particular to the discharge of milk from the udder of animals during the milking process.

BACKGROUND OF THE INVENTION

In the field of agricultural technology, it is common when milking dairy animals, such as cows, sheep, goats, and the like, to use a milking system with which the milk is extracted from the udder of the animal to be milked in a more or less automated manner. Regardless of the degree of automation of the milking system used, a teat cup is usually associated with a teat of the animal to be milked and typically has a suitable flexible liner or receptacle, also referred to as teat rubber, that directly contacts the teat and forms a channel which is in communication with the teat canal of the teat for extracting milk from the teat and thereby from a corresponding udder part. With today's milking technology, the elastic insert, which is made, for example, of silicone, is periodically applied pressure from the outside so that the elastic insert is "collapsed" so that it is possible to approximately replicate the sucking behavior of a young animal. The frequency and duration of this collapsing of the flexible insert depends on specific animal circumstances and can occur, for example, from 40 times to 120 times per minute.

In the phases in which the flexible insert of the teat cup is not collapsed, i.e. a maximum unconstrained flow path for the milk is present, this milk flows through the flexible insert into a downstream milk hose, which in turn in typical milking systems opens to a milk collection piece of relatively large volume from where the milk flows via a further hose or a line into a larger milk line in which the milk of several milking machines is joined or merged and delivered to a milk collection container. During the milking process, a teat cup with a corresponding flexible insert is therefore first applied to a respective teat, typically by a milker, where the adhesion of the teat cup is ensured on the basis of a negative operating pressure which is specific to the system and the animal. After the application of the teat cups, the actual milking process begins, which can involve, for example, a stimulation phase in which little or no milk is being milked, for example, in that the length of the collapse phase of the flexible insert of the teat cup is extended accordingly.

During the milking process, a teat cup can drop off for a variety of reasons, such as movement of the animal, due to a teat cup being knocked off, due to excessive milk flow, and the drop in the negative operating pressure that this causes, etc. This condition can go unnoticed for a long period of time in particular with larger milking systems, i.e. with systems where many animals are milked at the same time, and can lead to adverse effects. For example, it is problematic to have the dropped teat cup still be connected to the negative operating pressure, so that, firstly, the associated vacuum pump must provide greater performance due to the air ingress or at least a corresponding control valve must compensate for this additional air ingress in order to maintain conditions as stable as possible for the other teat cups and other tools. This can already lead to problematic fluctuations in the negative operating pressure and therefore to non-uniform conditions for the milking process, when milking several animals simultaneously, especially if they are particularly restless. A further serious drawback caused by dropping a teat cup is that there is always a suction effect present, due to the continued connection to the negative operating pressure, which causes foreign matter, such as straw, feces, etc., to enter the teat cup, i.e. enter the flexible insert, and to possible advance into the milk line. It is not possible or not provided in particular in many currently used milking systems that the teat cups are cleaned after each milking process at least in the upper region, so that, in particular, contamination, which arises with high likelihood due to the cup dropping off, can entail health impairment of the teats, also of subsequent animals to be milked. Furthermore, the risk of contamination of the milk due to foreign substances entering, including germ formation, increases significantly, so that the entire milk quality can be impaired, which, in addition to the negative effects of generally reduced hygiene, also entails significant economic disadvantages for the milk production business, since the quality of delivered milk is a factor for the milk price that can be obtained.

SUMMARY OF THE INVENTION

Due to the situation described above, it is an object of the present invention to provide a device in which the effects of a cup dropping during a milking process are reduced.

According to one aspect of the present invention, the aforementioned object is satisfied by a device for merging milk flows according to an embodiment.

The device according to the invention comprises a main body with several flow channels formed therein, where a first flow channel and a second flow channel run independently of each other, and a third flow channel is provided, to which the first flow channel and the second flow channel converge. The device further comprises a first port that is formed on the main body and is to be connected to a milk line of a first teat cup and leads to the first flow channel. Furthermore, the device comprises a second port that is formed on the main body and is to be connected to a milk line of a second teat cup and leads to the second flow channel. The device according to the invention comprises, in particular, a flow switching device adapted to switch at least one flow channel of the several flow channels in dependence of pressure, in that, for a predetermined range of negative pressure present in the third flow channel, following the occurrence of pressure equalization with respect to the external atmosphere in the at least one flow channel, the flow therein is constrained, and upon the formation of a negative pressure which is in the predetermined range, the flow constraint is cancelled.

According to the present invention, a device is therefore provided which contains suitable flow channels to allow for efficient discharge of the extracted milk without major flow losses, i.e. flow resistances occurring there, which can usually be observed in a conventional milk collection manifold, since respective space regions for collecting milk are often provided there. This means, efficient discharge of milk arises by providing the first and the second flow channel, which respectively converge to the third flow channel, so that high milk flows can also be delivered without the entire milking process being adversely affected, in particular without increasing the risk of a cup dropping due to a high milk flow. Furthermore, the flow switching device is provided in order to reliably constrain the flow of milk in at least one of the flow channels within the predetermined range of negative operating pressure, if pressure equalization to the atmosphere is detected there. This means, if a teat cup drops off during the milking process or also in a phase in which the negative operating pressure of the system is already applied to the teat cups, but the teat cups are not yet applied, constraining the flow in the respective flow channel is reliably accomplished. On the other hand, if a negative pressure is detected in the respective flow channel, which corresponds to a state in which the teat cup is applied to the teat during the milking process, the constraint is cancelled and a desired milk extraction can take place.

With the device according to the invention, firstly, stabilization of the desired negative operating pressure is achieved, for the reason that, for example, undesired air ingress into the negative operating pressure is avoided already when the teat cup is applied, as long as a respective teat cup is not yet mechanically coupled to the teat. As a result of this stabilization, the milking process for one animal is not influenced by the application of the teat cups to another animal or to another teat of the same animal. Even when a teat cup is dropped during milking, stabilization of the negative operating pressure is obtained since there is no significant ingress of air, because the reliable constraint of the flow is effected by the flow switching device according to the invention shortly after the teat cup has detached from the teat. Due to the lacking suction effect a teat cup is dropped and lying on the ground, a significantly lower level of contamination also arises, so that the effects in terms of impairment of udder health and milk quality have been significantly reduced.

In one advantageous embodiment, the flow switching device is configured to switch the third flow channel in dependence of pressure. This means, in the event of pressure equalization in the third flow channel or in a region upstream of the third flow channel, i.e. in the first and/or the second flow channel, the flow is constrained in this third flow channel and the milk flow is therefore substantially interrupted, where this is triggered, for example, when one of the teat cups connected to the first and the second flow channel drops off. In the event of air ingress due to a single teat cup dropping off, the flow in the third flow channel is constrained and thereby substantially interrupted, so that a gradual reduction of the negative operating pressure occurs also in the other teat cup that is not dropped and the teat cup ultimately drops off.

In this manner, a "symmetrizing" effect on the overall milking process is achieved when a single cup is dropped, at least in relation to the two teat cups mentioned. With animals that have only two teats, asymmetrical emptying of the udder is avoided in this manner when a teat cup drops off.

In one further advantageous embodiment, the flow switching device is configured to respectively switch the first and the second third flow channel in a pressure-dependent manner and independently of each other. In this embodiment, a teat cup dropping off can therefore be detected individually and the respective flow can be constrained accordingly, without the milk extraction in the other teat cup being influenced. This structure is advantageous in situations in which the shortest possible duration of the milking process has priority and possibly slightly different milk extraction of individual udder regions has little influence on the udder health, for example, if milking is performed several times a day and complete and/or uniform milking is not necessary or desired.

In one advantageous variant, the flow switching device comprises a flow section and a sealing body arranged movably therein in the at least one flow channel. With the flow channel provided in the respective flow section, a structurally simple arrangement in combination with the sealing body can be obtained, which, firstly, enables a reliable switching function, and secondly, represents a low structural complexity, where at the same time the lowest possible flow resistance is generated in the respective flow channel. The use of as few components as possible, which in particular have a simple structure, also enables reliable cleaning after the milking process, so that no additional sources for possible germ development by the components for achieving the shut-off function are introduced.

The sealing body is preferably configured as a sphere which is made, in particular, of a food-grade material.

In one further embodiment, the flow switching device comprises a spring element which reacts to the pressure in the at least one flow channel and which at least intermittently contacts the sealing body. This means, the spring element applies force to the sealing body when there is negative pressure in the respective flow channel but returns to a neutral position due to the spring action, so that it is ensured that the sealing body is held in the non-constraining position during normal operation and in the event of air ingress assumes a position required to constrain the flow.

In one preferred embodiment, the spring element is a membrane that is in contact with the external atmosphere. Due to the use of a membrane as a spring element, a structurally simple component is provided which offers uniform spring characteristics over a long period of time and on the inner side is also provided with a suitable surface, so that potential exposure to milk does not result in contamination of the milk and at the same time ensures a desired behavior when the flow channels are cleaned. The spring action is therefore achieved by the resilient properties of the membrane in combination with the external atmosphere, where the desired resilient properties can be adjusted efficiently on the basis of the selected material, the material thickness, the size and the general shape of the membrane.

In a preferred variant, the range of negative operating pressure is 30 kPa to 55 kPa. This information is to be understood as a relative pressure indication which refers to the external atmosphere. This means, negative operating pressure of 30 kPa indicates a negative pressure relative to the external atmosphere of 30 kPa, whereas the value of 55 kPa represents a greater "vacuum", meaning, a greater pressure difference relative to the external atmosphere. The device according to the invention can therefore reliably perform the switching function in a relatively wide range of negative operating pressure, so that the milking conditions of many milking systems and in particular possible fluctuations in the negative operating pressure during the milking process are taken into account therewith.

In an advantageous variant, the flow switching device is adapted such that its switching function can be performed at a flow rate of fluid in the at least one flow channel in the range from 0 kg/minute to 6 kg/minute. This means, the device according to the invention is adapted such that a reliable switching function is ensured for a range of 0 flow rate, i.e. for example, when applying the teat cup, up to relatively high flow rates of milk.

It is to be noted that measuring a respective flow rate, which can very well be a pulsating flow, if, for example, the flexible liner of a teat cup is made to collapse periodically, as described in the introductory part, can be effected by using a flow meter and any suitable liquid, such as water. The quantitative determination of this property can then be done by a suitable combination of parameters, such as the diameter of the individual flow channels, their length, the nature of the sealing body, the properties of the membrane or the spring element, and the like.

In a further variant, the device further comprises an outlet for coupling to a milk line, where the outlet is configured as a module that is connectable to the main body such that a flow connection between the third flow channel and the outlet is established. This means, the device according to the invention is suitable for the discharge of the extracted milk, where in particular the modular structure of the outlet allows for a high degree of flexibility in the adaptation to existing milking system. For example, different diameters, lengths, orientations and the like can be provided for an outlet nozzle of the outlet, which are then connected to the main body according to certain system-specific conditions in order to achieve the desired operating behavior.

In one further advantageous embodiment, the device further comprises a second flow switching device which is adapted to switch the third flow channel of the several flow channels, in that the flow, in a first state of an applied control signal, is constrained therein and, in a second state of the applied control signal, the flow constraint is cancelled. With this further variant, the third flow channel and thus the discharge of milk, but also the return flow of milk from a downstream milk line in particular operating phases can then be substantially prevented in a controlled manner. This additional switching function can be used advantageously, for example, after termination of the milking process, i.e. after removal of the teat cups, to prevent a backflow of milk from the milk line through the device according to the invention and out of the teat cups.

In further advantageous variants, the second flow switching device is configured in the form of a flow section and a sealing body arranged movably therein in or downstream of the third flow channel. The sealing body of the second flow switching device in one variant is designed as a sphere. Furthermore, in one configuration variant, the second flow switching device comprises a spring element which contacts the sealing body when either the first state or the second state of the control signal is present and returns to its initial state when the other state is present. This ensures a structurally simple but very reliable configuration.

In a further variant, the spring element is configured as a membrane. As a result, the spring properties can be adjusted in many ways by material selection, material thickness, shape and size of the membrane.

In advantageous embodiments, the range of the negative operating pressure, in which a reliable switching function is obtained, can be adjusted by the spring element, where the structure of the flow switching device and/or the second flow switching device is otherwise identical. As already mentioned above, very different operating conditions can prevail in different milking systems, so that, for example, in some operations a relatively low negative operating pressure of approx. 30 kPa to approx. 40 kPa is used to take account of animal-specific circumstances, while other systems use negative operating pressure in the range of 38 kPa and significantly above. In this case, the adaptation of the operating range of the flow switching device can be achieved by exchanging the spring element, in order to thereby cover the desired operating range. When using a membrane as a spring element, any adjustment to the desired operating range can be achieved in a simple manner by exchanging the membrane. For this purpose, respective spring elements or membranes can be used which differ in their resilient properties, but otherwise have the same installation dimensions, so that a respective adaptation to the desired operating range is effected by way of the different spring force. In advantageous configuration variants, spring elements are therefore provided which cover an operating range for reliably switching the flow switching device from 30 kPa to 40 kPa, from 36 kPa to 48 kPa, from 38 kPa to 50 kPa, from 40 kPa to 55 kPa.

In one further embodiment, the control signal is generated by adjusting a pressure in a pressure chamber of the second flow switching device. This means, the switching function is performed on the basis of two different pressure states in the pressure chamber, so that efficient mechanical actuation of the switching function of the second flow switching device can be accomplished, without this requiring additional electrical or other devices. Since two different pressure states, such as the negative operating pressure and the pressure of the external atmosphere, are typically available anyway, these two pressure states can also be used efficiently as a control signal for the second flow switching device.

In one further configuration variant, the device comprises a switching element which is adapted upon actuation to block the switching function of the flow switching device without constraining the flow. This means, the switching element can be used to "activate" the flow switching device. Such a function is particularly advantageous if, for example, an operating phase is given when the milking system is cleaned in which the negative pressure in the system is outside the negative operating pressure, in which the switching device operates reliably, so that a flow is always possible without undesired switching of the low switching device. For example, a relatively high negative pressure is typically used when cleaning the milking system which is significantly higher than the negative operating pressure during the milking operation, so that a flow of the cleaning liquid is nevertheless ensured due to the switching element.

According to a further aspect of the present invention, the aforementioned object is satisfied with a method for providing a flow switching function in a milking system. The method involves determining flow conditions for the delivery of milk from an animal to be milked to a milk collection line and adjusting an overall flow resistance of a device for merging milk flows, as described above. The adjustment of the overall flow resistance is there effected such that the switching function of the flow switching device is ensured for a given range of negative operating pressure.

Advantageously, the adjustment of the overall flow resistance is done by increasing the overall resistance, where this is done in a variant by adding a resistance in or downstream of the third flow channel.

As already explained above, the formation of flow channels in the device according to the invention is achieved by avoiding to the extent possible unnecessary flow resistances which would be caused by a reversal of the flow direction by 180°, additional dead spaces, and the like, so that efficient discharge of milk is ensured even with high milk flows. However, in order to reliably ensure the desired switching behavior for a desired range of negative operating pressure, the overall state of the milking system may possible have to be taken into account, which is achieved according to the invention by adjusting the overall flow resistance according to the knowledge about the flow conditions in the milking system. This can be done, for example, by suitable selection of the parameters for the device, such as the diameter of the flow channels, the length of the flow channels, the flow behavior of the flow switching device, the switching characteristics, such as the response to negative pressure, the restoring force for the initiation of the flow constraint, etc. In particular, it is taken into account in the method according to the invention in advantageous variants that the basically low-flow structure of the device can therefore be suitably varied, for example, by increasing the overall flow resistance, so that an optimal adjustment can be achieved. For this purpose, for example, a suitable flow body is added and/or in particular the flow resistance is adapted in that the flow behavior of a modular component, such as an outlet, is adjusted accordingly.

BRIEF DESCRIPTION OF THE DRAWINGS

The aforementioned configuration variants as well as further configuration variants shall now be described in more detail with reference to the accompanying drawings, where in the drawings:

FIG. 1a shows a schematic perspective view of the device according to the invention according to one embodiment;

FIG. 1b is a top view onto the device according to the invention of FIG. 1a;

FIG. 1c is a sectional view corresponding to arrows A of FIG. 1b;

FIG. 2b is a top view onto the embodiment of FIG. 2a;

FIG. 3a is a perspective view of the device, in which a second flow switching device is provided, according to a further illustrative embodiment;

FIG. 3b is a top view onto the embodiment of FIG. 3a; and

FIG. 3c is a sectional view corresponding to arrow D of FIG. 3b.

DETAILED DESCRIPTION OF THE PREFERRED EMBODIMENTS

Figure 2B:
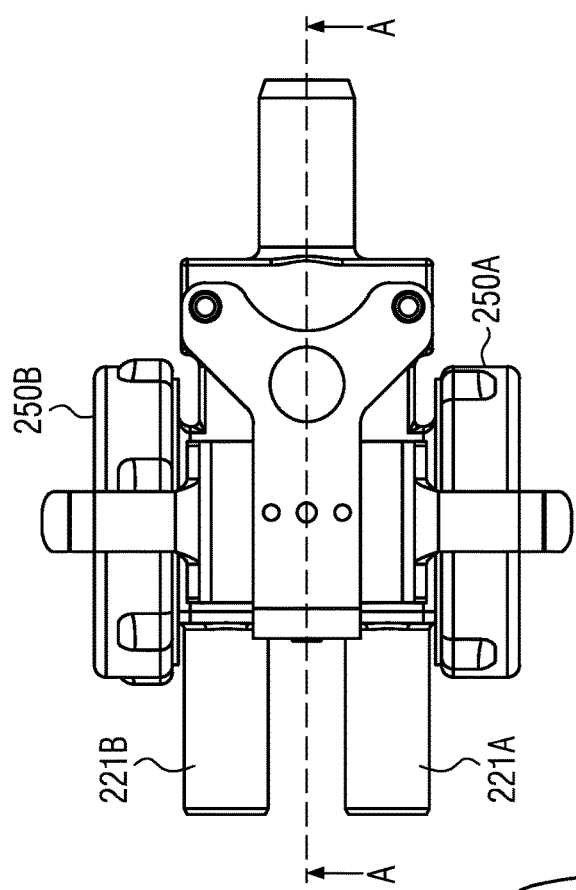

FIG. 1a shows a perspective view of a device for merging milk flows 100 according to an illustrative embodiment of the present invention. Device 100 comprises a main body 110 constructed of any suitable material and having a shape that is suitable for use in a milking system. Formed in main body 110 are several flow channels. A first flow channel 121A is formed as a continuation of a first port 120A in body 110, a second flow channel 121B is formed as a continuation of a second port 120B in body 110, and a third flow channel 121C (see FIG. 1c) is formed in body 110 such that flow channels 121A, 121B converge therein, so that overall a relatively low-resistance flow path for milk or other fluid is formed. This means, first port 120A and second port 120B are formed such that they can be connected by way of a milk hose, not shown, to a teat cup, not shown, thereby forming a flow path for a negative operating pressure and a liquid to be milked out.

Furthermore, device 100 comprises a flow switching device 150 which in the embodiment shown is designed such that it can constrain or release the flow in third flow channel 121C (see FIG. 1c) in a pressure-dependent manner. Constraining, i.e. a significantly restricting a momentary flow, is to be understood as being a reduction of a currently prevailing flow by more than 90%. This means, flow switching device 150 is configured such that, when the pressure equalizes or the pressure almost equalizes relative to an external atmosphere in the third flow channel, such as when air enters first flow channel 121A and/or second flow channel 121B, a constraint or a significant reduction of the flow through third flow channel 121C (see FIG. 1c) is effected such that the constrained flow is less than 10% and preferably less than 3% of the flow present before pressure equalization.

Furthermore, an outlet 160 is provided in device 100 in the illustrated embodiment and comprises a suitable outlet nozzle 161 to be connected to a milk line for delivering milk extracted via ports 120A, 120B with the lowest possible flow resistance into the milk line and ultimately into a milk collection container. In the embodiment illustrated, port 160 is formed as a module that can be removably attached to main body 110. In this way, port 160 can be suitably adapted to an existing milking system in which outlet nozzle 161 possibly does not extend in extension to the general direction of ports 120A, 120B, but instead, for example, is disposed at an angle thereto. Furthermore, the modular configuration of outlet 160 allows otherwise identical device 100 to provide different flow characteristics, in that, for example, the length and/or the cross-sectional shape and/or the size of the cross-section and/or the angular geometry of port nozzle 161 are suitably selected for an existing milking system. In other configuration variants, a flow resistance can possibly be added in addition to the aforementioned characteristics of port 160, for example, within nozzle 161, to adjust an overall flow resistance of device 100 in a suitable manner in that a suitable port module 160 is connected to main body 110.

FIG. 1b shows a top view onto device 100 with port 160.

FIG. 1c is a sectional view corresponding to the arrows A of FIG. 1b of device 100. As shown, flow channel 121B and correspondingly also configured flow channel 121A running separately, not shown, are arranged to converge to flow channel 121C in order to have the two flow channels 121A, 121B join or merge with as little resistance as possible without creating unnecessary dead zones which in conventional milk collection parts lead to pronounced pressure losses and therefore usually require an increased negative operating pressure. In the embodiment illustrated, flow switching device 150 in the form of a flow section 151 formed in third flow passage 121C, is shown in connection with a sealing body 152 and a membrane 153. Sealing body 152 is formed, for example, as a sphere which is made of a suitable material, such as food-grade plastic material, etc. Flow section 151 has suitable dimensions which, firstly, avoid unnecessary dead zones, secondly, allow a certain freedom of movement of movable sealing body 152 so that pronounced constraining of the flow in flow channel 121 C is possible, but on the other hand, cancelling the constraint by releasing a substantial part of the cross-section of flow channel 121C is possible For example, the position of sealing body 152 shown in FIG. 1c leads to the flow being constrained, so that, in particular, no significant air entry occurs in a part 151N of flow channel 121C downstream of flow section 151, i.e. in the illustration of FIG. 1c, the section to the right of sealing body 152. This means, flow passage 121C includes flow section 151 in which sealing body 152 is movably disposed and part 151N that leads to port 161. No suction effect is therefore exerted, in particular in flow channels 121A, 121B, when the pressure is almost equal to the exterior atmosphere. In the embodiment illustrated, device 150 comprises membrane 153 as a spring element which with its outer side is in contact with the exterior atmosphere, so that membrane 153 assumes a shape and a position in which it does not contact sealing body 152 when the pressure of the exterior atmosphere substantially prevails also in the interior of flow section 151. This is caused by the inherent resilience of membrane 153. On the other hand, when a negative pressure prevails or gradually develops in the flow section, for example, for the reason that the negative operating pressure substantially prevails or can build up in the entire flow path upstream of flow section 151, i.e. in FIG. 1c the left-hand part, when the teat cup is applied, for the reason that the upstream flow path is sealed by applying the teat cup to the teat and a slight extraction of the atmospheric air from flow section 151 due to an intended incomplete tightness of body 152 arises, membrane 153 is sucked inwardly against its own resilience and touches sealing body 152, for example, via a plunger 154 attached to membrane 153, so that sealing body 152 is displaced from its flow-constraining position and thus releases the flow path. Conversely, membrane 153 returns to its initial position, for example, when air ingresses in one of the upstream flow channels, i.e. in flow channel 121A and/or 121B, so that sealing body 152 is brought into the position shown in FIG. 1c due to the suction effect arising from the downstream portion of flow channel 121C, so that the flow is constrained accordingly.

Further embodiments are described with reference to FIGS. 2a to 2c in which flow channels can be switched individually, i.e. independently of each other.

Figure 2C:
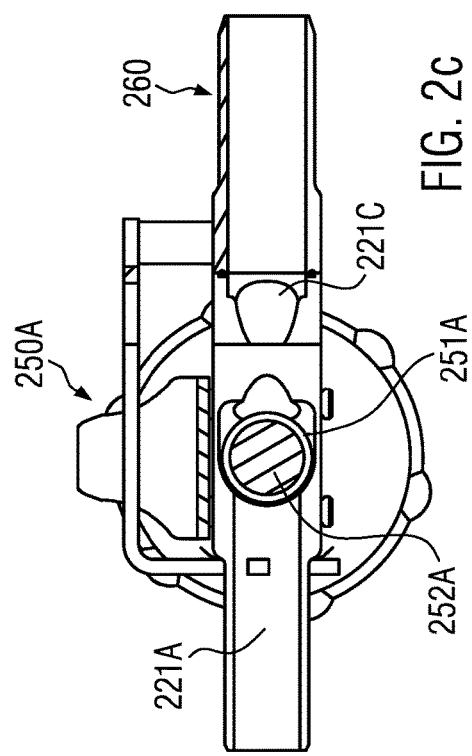
FIG. 2c is a sectional view of the embodiment according to arrow A of FIG. 2b.
Figure 2A:
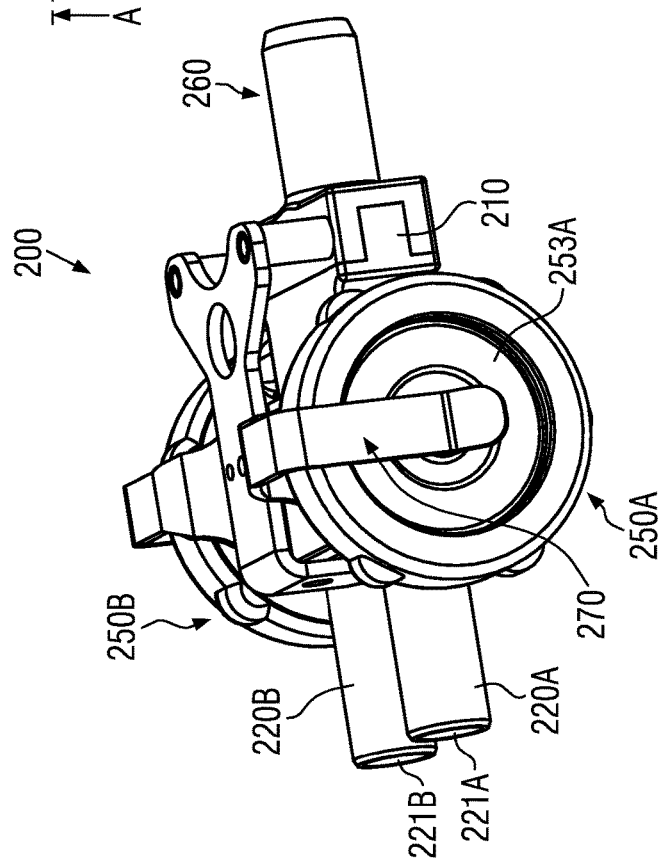
FIG. 2a is a perspective view of the device according to the invention according to one embodiment in which flow channels can be switched individually according to an illustrative embodiment.

FIG. 2a shows a perspective view of a device 200 with a main body 210 in which a first and a second flow channel 221A, 221B are formed which each continue in a first port 220A, 220B. This means, the ports lead to the respective flow channels. Ports 220A, 220B have similar characteristics as previously described with respect to embodiment 100. Furthermore, a port 260 is provided, for example, as a removable module, which is connected to a third flow channel, which is not shown in FIG. 2a. Furthermore, a flow switching device is provided which is configured such that it can switch the flow in channels 221A, 221B individually and independently. For this purpose, a first part 250A of the switching device and a second part 250B are provided which in principle can have the same structure, so that only the structure of one part of the flow switching device shall be described below. Part 250A of the switching device in the present embodiment comprises a membrane 253A which serves as a spring element and is in contact with the exterior atmosphere, as already described in a similar manner in connection with flow switching device 150. In the embodiment shown, a mechanical switching element 270 is further provided which in a first position exerts no effect on the two parts 250A, 250B of the flow switching device, while in a second switching state causes the two parts of switching device 250A, 250B to be and remain locked in a respective switched position, where no constraining of the flow in the respective flow channels is given in this position.

FIG. 2b shows a top view onto device 200 with the two parts 250A, 250B of the flow switching device for individual switching of the two flow channels 221A, 221B.

FIG. 2c is a sectional view corresponding to arrow A of FIG. 2b. As shown, a flow section 251A of flow part 250A of the flow switching device is formed in first flow passage 221A in which a movable sealing body 252A is arranged which can assume a pressure-dependent position in which the flow in passage 221A is constrained if, for example, pressure equalization to the exterior atmosphere occurs in the upstream region of flow channel 221A, i.e. in the left-hand region in FIG. 2c. On the other hand, sealing body 252A is pushed away from this position by membrane 253A (see FIG. 2a) when a negative pressure is present or created in the upstream region of flow channel 221A, so that the constraint in flow in flow channel 221A is again canceled by the motion of membrane 253A. The switching function arises in a similar manner like with embodiment 100 described in the context of FIG. 1.

Similarly, part 250B (see FIG. 2b) is configured and operates in an analogous manner, but where second flow channel 221B is switched depending on the pressure prevailing therein.

This means, in the event of pressure equalization, i.e. when a teat cup drops or when a teat cup which, for example, has not yet been applied and is connected, for example, to flow channel 221A, the function of the other flow channel 221B in device 200 can be maintained almost uninfluenced, since it continues to be connected to flow channel 221C and can therefore discharge milk and/or provide the negative operating pressure at the teat.

Further illustrative embodiments are described with reference to FIGS. 3a to 3c in which one or more flow channels are switched and a second flow switching device is provided at the same time to switch the third flow channel.

FIG. 3a shows a device 300 with a main body 310 in which several flow channels 321A, 321B and 321C (see also FIG. 3c) are formed such that flow channels 321A, 321B lead to flow channel 321C, as is the case also with the embodiments already described above. Furthermore, a flow switching device is provided which, in the embodiment shown, can independently switch the two flow channels 321A, 321B and in this respect comprises a first part 350A and a second part 350B, which can be formed in a similar manner as described above in the context of embodiment 200. In one further embodiment, which is not shown, the flow switching device is formed as explained, for example, in the context of embodiment 100, such that the third flow channel can be switched when one or both flow channels 321A, 321B experience air ingress, as has also previously been explained. Furthermore, a switching element 370 is provided in the embodiment illustrated which performs the same function as previously explained in the context of switching element 270 of embodiment 200. Device 300 further comprises a port 360 which represents, for example, an angulated outlet for connection to a milk line and is in communication with third flow channel 321C. In this embodiment as well, port 360 is formed as a module so that it can be removably attached to main body 310. In other configuration variants (not shown) as well as in configuration variants which are described in the context of embodiments 100 and 200, port 360 can also be fixedly connected to main body 310 and then be part thereof. Furthermore, a second flow switching device 380 is provided which can switch a flow in or downstream of the third flow channel on the basis of a control port 386 and therefore on the basis of a control signal supplied through control port 386.

FIG. 3b shows a side view of device 300, where part 350A of the flow switching device and port 360 are shown in connection with second flow switching device 380.

FIG. 3c is a sectional view corresponding to arrow D of FIG. 3b. As shown, flow channels 321A, 321B, which are each continuations of ports 320A, 320B, i.e., ports 320A, 320B lead into respective flow channels 321A, 321B, are formed in the main body such that they converge to flow channel 321C. Part 350A of the flow switching device is formed in flow channel 321A such that pressure-dependent switching can be performed between a flow-constraining position and a non-constraining position. As shown, part 350A is provided in the form of a flow section 351A, a movable sealing body 352A, a membrane 353A in combination with a plunger 354A, where the function is effected in the same manner as previously explained in the context of the preceding embodiments.

Similarly, part 350B of the flow switching device having a flow section 351B in second flow channel 321B is configured in connection with a sealing body 352B, a membrane 353B, and a plunger 354B attached thereto or formed thereon. The previously described explanations apply also for this part of the flow switching device with regard to function and properties.

Further flow switching device 380 in the embodiment shown is formed by a flow section 381, which is formed in third flow channel 321C and/or in a downstream flow path as part of port 360, a movable sealing body 382, such as a sphere, and a membrane 383 with a plunger 384 attached thereto. Membrane 383 serves as a spring element and by contacting sealing body 382, e.g. by way of plunger 384, can make the former assume a first position in which the flow is constrained or the flow is not constrained, depending on the configuration. In a second position, on the other hand, which is complementary to the first position, in which the sealing body 382 is not acted upon with pressure by membrane 383, a non-constraining or a constraining position is assumed by sealing body 382, depending on the configuration. The position of membrane 383 can be adjusted by the pressure conditions in a pressure chamber 385 in that the respective control signal is applied via port 386 (see FIG. 3a). For example, in the event of negative pressure in flow section 381 and atmospheric pressure in pressure chamber 385, a deformation of membrane 383 is achieved such that sealing body 382 is acted upon with force from contact with plunger 384. On the other hand, if nearly equal pressure conditions prevail in flow section 381 and in pressure chamber 385, e.g. negative pressure relative to the exterior atmosphere, membrane 383 returns substantially to its initial position, so that movable sealing body 382 can assume a second position.

In this way, it is possible to controllably constrain third flow channel 321C and to substantially prevent, in particular, the backflow of milk or other fluid into first and second flow channel 321A, 321B, for example, when fluid is still present in the milk line connected to port 360 and this liquid would otherwise flow back. This is an efficient technique for preventing the escape of milk from the line after the milking process, in particular for milk lines that are installed in an elevated manner. For example, milking parlors for goats and sheep are often provided with such milk lines in an elevated installation.

The embodiments described above allow for reliable switching of the respective flow channels for a flow of liquid, whether a pulsed or continuous flow, from 0 kg/min. to 6 kg/min. at a negative operating pressure range of 30 kPa to 55 kPa. For this purpose, the respective dimensions are to be adapted accordingly, where approximately a cross section of the first and the second flow channel is characterized by a diameter in the range of 9-15 mm for all embodiments, the flow cross-section of the third flow channel embodiments is characterized by a diameter in the range of 9-15 mm for all embodiments and the lengths of the respective flow channels are in the range of 2-15 cm, where the length of the associated ports for the first and the second flow channel are respectively included. For example, the respective spheres 152, 252A, 352A, 352B have a diameter in the range of 10-16 mm For a reliable switching function for the flow channels, the mechanical properties and other properties of the flow switching device are determined such that reliable switching in the event of air ingress and the cancellation of air ingress is given in the specified range of negative operating pressure for the range of flows specified. For this purpose, as already stated, the size and shape of the spring element in the form of the respective membranes can be determined by simple experimentation. For example, in one embodiment, a silicone membrane having a thickness of 0.3 mm to 0.8 mm, a diameter of 25 mm to 45 mm is used in combination with a silicone plunger integrally molded on to realize the function of the spring element. It will be readily appreciated, however, that other suitable parameters are to be selected for a different material mixture of the silicone, harder or softer, or generally when using other resilient material, to obtain the required spring action. For example, with a given shape of the respective flow section in which the movable sealing body is present, a suitable shape and/or material mixture and/or material thickness and/or size of the membrane can be determined in that the required operating conditions are set, and the switching function is then tested for different parameters. In illustrative variants, the spring elements can be manufactured to cover different ranges of negative operating pressure, such as ranges from 30 kPa to 40 kPa, from 36 kPa to 48 kPa, from 38 kPa to 50 kPa, from 40 kPa to 55 kPa.

It should be noted that the conditions for the negative operating pressure and the flow rate referred to in this specification can be readily determined using conventional meters suitable for pressure measurement, for flow rate measurement, or time-resolved quantity measurement. The parameters given apply in particular also to the flow of water as the medium to be discharged, where the temperature of the water should be in the range of 8° C. to 25° C.

Furthermore, each of the above-described embodiments can be efficiently adapted to given operating conditions and a given system geometry by first determining the flow conditions in a given milking system, such as by performing a test operation with a device according to the invention having minimum flow resistance and determining its switching behavior and then, on the basis of these results, adjusting the flow resistance of the device according to the invention. For this purpose, for example, the overall flow resistance is adjusted, such as by adjusting a flow resistance of one or more components of the device, such as a module with a port, and the like, as already explained above. In this way, a main body of a similar kind with the flow channels formed therein and the flow switching device can be used in combination with different modules for adjusting the overall flow resistance, so that an optimal result for the milking system at issue is obtained.

The arrangements illustrated in the embodiments with two ports for the teat cups are advantageous for milking animals with two teats. However, the present invention is not restricted thereto and, for example, two such devices can be combined in other configuration variants, for example, by increasing the main body accordingly to accommodate a greater number of flow channels that ultimately converge to a single outlet flow channel. Here as well, it is possible to provide a flow switching device which switches only the last flow channel or a flow switching device can be provided in which the individual flow channels, which are to be connected to the respective teat cups, can be switched individually.

The present invention therefore provides a modular system for constraining milk flow in a pressure-dependent and/or controlled manner. Due to the modular concept, the required properties of the device can be adjusted in an efficient manner. For example, it is possible to adapt the connection to a milk line, i.e., the geometry of the port arrangement, specifically to the existing conditions of the milking stall and the milking system. The pressure-dependent constraining when milking can be adjusted specifically for a single teat or in pairs for two teats by using a respective module component. If necessary, an adjustment of the range for reliable switching can be performed by selecting suitable spring components and/or by adapting the flow resistance. The flow resistance is adjustable by using a suitable connection arrangement and/or by exchanging a modular flow body.

What is claimed is:

1. Device for merging milk flows, comprising:
a main body with several flow channels formed therein, where a first flow channel and a second flow channel run independently of each other, and a third flow channel is provided, to which said first flow channel and said second flow channel converge,
a first port that is formed on said main body and to be connected to a milk line of a first teat cup and that leads to said first flow channel,
a second port that is to be connected to a milk line of a second teat cup is formed on said main body and leads to said second flow channel,
a flow switching device comprising,
an unattached freely movable sealing body placed within said main body, and
a spring membrane having a plunger with a distal end positioned adjacent said unattached freely movable sealing body,
wherein said flow switching device is adapted to switch at least one flow channel of said several flow channels in dependence of pressure, in that, for a predetermined range of negative pressure present in said third flow channel, following the occurrence of pressure equalization with respect to the external atmosphere in said at least one flow channel, the flow therein is constrained, and upon the formation of a negative pressure, which is in the predetermined range, the flow constraint is cancelled.

2. Device for merging milk flows according to claim 1, wherein said flow switching device is configured to switch said third flow channel in dependence of pressure.

3. Device for merging milk flows according to claim 1, wherein said flow switching device is configured to respectively switch said first and said second flow channels in a pressure-dependent manner and independently of each other.

4. Device for merging milk flows according to claim 1, wherein said unattached freely movable sealing body is configured as a sphere.

5. Device for merging milk flows according to claim 1, wherein said spring membrane is in contact with the external atmosphere.

6. Device for merging milk flows according to claim 1, wherein the range of the negative pressure is 30 kPa to 55 kPa.

7. Device for merging milk flows according to claim 1, wherein said flow switching device is adapted such that its switching function can be performed at a flow rate of fluid in said at least one flow channel in the range from 0 kg/min. to 6 kg/min.

8. Device for merging milk flows according to claim 1, further comprising a second flow switching device which is adapted to switch said third flow channel of said several flow channels, in that the flow, in a first state of an applied control signal, is constrained therein and, in a second state of the applied control signal, the flow constraint is cancelled.

9. Device for merging milk flows according to claim 8, wherein said second flow switching device comprises a flow section and a second unattached freely movable sealing body arranged movably therein in or downstream of said third flow channel.

10. Device for merging milk flows according to claim 9, wherein said second unattached freely movable sealing body of said second flow switching device is configured as a sphere.

11. Device for merging milk flows according to claim 10, wherein said second flow switching device comprises a second spring membrane having a second plunger with a second distal end which contacts said second unattached freely movable sealing body when either the first state or the second state of said applied control signal is present and returns to its initial state when the other state is present.

12. Device for merging milk flows according to claim 8, wherein said applied control signal is generated by adjusting a pressure in a pressure chamber of said second flow switching device.

13. Device for merging milk flows according to claim 1, further comprising a switching element which is adapted upon actuation to block the switching function of said flow switching device without constraining the flow.

14. Device for merging milk flows according to claim 1, further comprising an outlet for coupling to a milk line, where said outlet is configured as a module that is connectable to said main body such that a flow connection between said third flow channel and said outlet is established.

15. Device for merging milk flows according to claim 14, where said module is provided in variants with different flow resistances.

16. Device for merging milk flows according to claim 15, wherein said module is provided in variants with different connection geometries.

17. Device for merging milk flows according to claim 1, wherein at least one outlet, said first flow channel, said second flow channel and said third flow channel are adapted to receive a modular flow body for adjusting the flow resistance.

18. Device for merging milk flows according to claim 1, wherein said spring membrane is configured as a modular unit for adjusting a desired range of negative operating pressure.

19. Method for providing a flow switching function in a milking system, comprising the steps of:
determining flow conditions in a discharge of milk from an animal to be milked to a milk collection line, and
adjusting an overall flow resistance of a device for merging milk flows according to claim 1 such that a switching function of said flow switching device is ensured for a given range of negative operating pressure.

20. Method according to claim 19, wherein adjusting an overall flow resistance comprises increasing the overall resistance.

21. Method according to claim 20, wherein the overall flow resistance is increased by adding a resistance in or downstream of said third flow channel.

22. Method according to claim 19, further comprising the step of:
adjusting a switching range of said flow switching device for a desired range of negative operating pressure by selecting a spring element suitable for this.

23. Method according to claim 19, further comprising the step of:
adapting a connection geometry by selecting a connection module suitable for the desired connection geometry.

24. A device for merging milk flows from teat cups used for milking an animal comprising:

a main body having a chamber with a first and second flow channel merging into a third flow channel;

a first port in said main body coupled to the first flow channel, whereby said first port is configured to be coupled to a first milk line of a first teat cup;

a second port in said main body coupled to the second flow channel, whereby said second port is configured to be coupled to a second milk line of a second teat cup;

an outlet nozzle coupled to the third flow channel, whereby said outlet nozzle is configured to be coupled to an outlet milk line;

an unattached freely movable sealing body placed within said main body between said first and second ports and said outlet nozzle;

a spring membrane attached to said main body and having an inner surface open to the chamber of said main body; and a plunger attached to the inner surface of said spring membrane and having a distal end positioned adjacent said unattached freely movable sealing body, whereby when the first and second teat cups are not attached to an animal said unattached freely movable sealing body freely moves to constrain milk flow to said outlet nozzle and when the first and second teat cups are attached to an animal a negative pressure in the chamber causes said spring membrane to move into the chamber causing the distal end of said plunger to contact said unattached freely movable sealing body displacing said unattached freely movable sealing body permitting unconstrained milk flow to said outlet nozzle.

25. A device for merging milk flows from teat cups used for milking an animal as in claim 24 further comprising:

a recess formed in said main body inside the chamber positioned to receive said unattached freely movable sealing body, whereby upon contact of said unattached freely movable sealing body by the distal end of said plunger said unattached freely movable sealing body is displaced into said recess.

\* \* \* \* \*